Sept. 29, 1931.  H. P SLEEPER  1,824,842
TEMPERATURE INDICATING DEVICE
Filed April 7, 1920
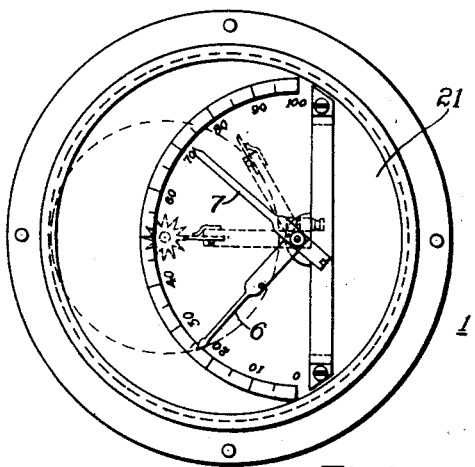
Fig.1.
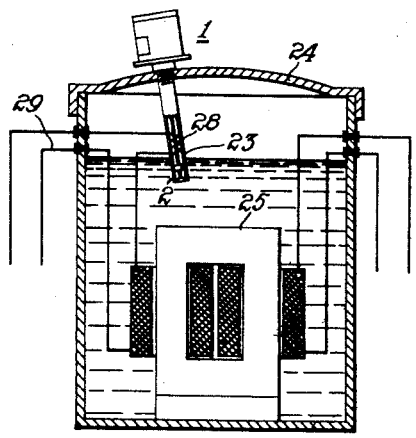
Fig.5.
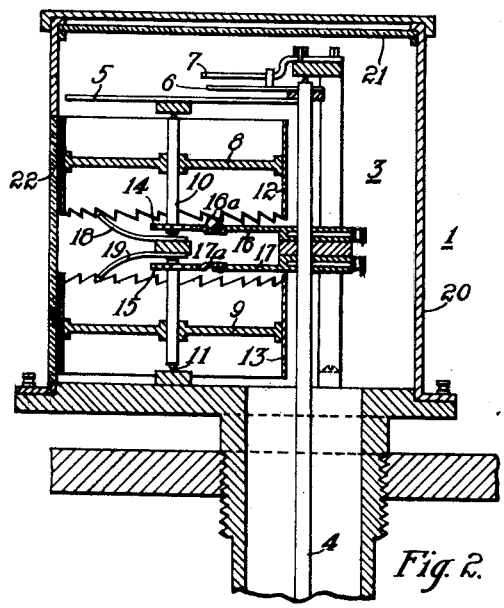
Fig.2.
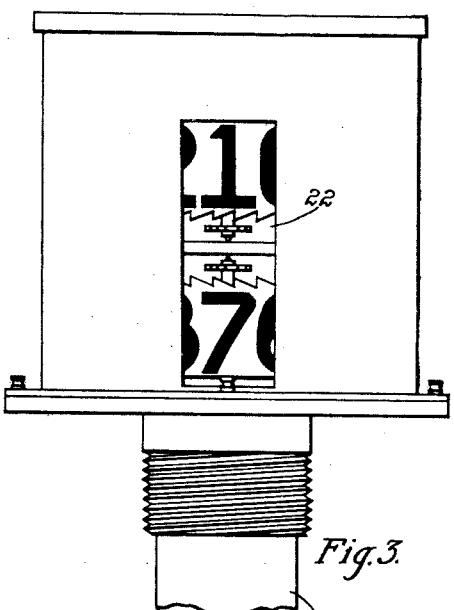
Fig.3.
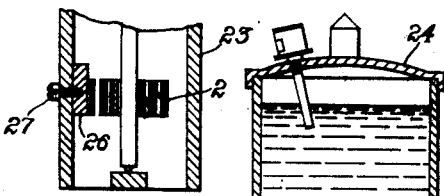
Fig.4.
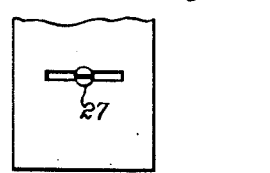
WITNESSES:
H. T. Shelhamer
J. E. Foster
INVENTOR
Harvey P. Sleeper
BY
Wesley G. Carr
ATTORNEY Patented Sept. 29, 1931

1,824,842

UNITED STATES PATENT OFFICE

HARVEY P. SLEEPER, OF WILKINSBURG, PENNSYLVANIA, ASSIGNOR TO WESTINGHOUSE ELECTRIC & MANUFACTURING COMPANY, A CORPORATION OF PENNSYLVANIA

TEMPERATURE INDICATING DEVICE

Application filed April 7, 1920. Serial No. 371,939.

My invention relates to temperature-indicating devices and particularly to temperature-indicating and registering devices for electrical apparatus.

One object of my invention is to provide a temperature-indicating device that shall have means for indicating the instantaneous and the maximum temperatures attained and that shall also have means for indicating the recurrence of a plurality of predetermined temperatures in a translating device such as a transformer.

Another object of my invention is to provide a temperature-indicating device, of the above-indicated character, for outdoor pole-mounted transformers, that shall have the indicating mechanism so disposed as to be visible from the street at the base of the pole.

Another object of my invention is to provide a device, of the above-indicated character, that shall be simple and economical in construction and reliable in its operation.

In practicing my invention, I provide a spirally-wound bimetallic member that may be disposed in the oil of a transformer and an indicating mechanism that is actuated by the bimetallic member and that may be disposed outside of the casing of the transformer. The indicating mechanism comprises a stationary dial plate that is calibrated in centigrade degrees and two movable indicating hands or pointers, one of which is directly actuated by the bimetallic member through a shaft to which the member is secured. The second, or maximum pointer, is actuated by the former pointer and remains in the extreme position of its movement. Two circular members, that have vertical figures disposed on their peripheries, are respectively actuated by means of two pawl-and-ratchet mechanisms when the temperature of the oil attains or exceeds two predetermined values. The mechanism is enclosed by a hood that has a glass top through which the indicating dial is visible. The hood is further provided with a transparent window on one side thereof, through which the figures on the circular members are visible. The figures on the circular members indicate directly the number of times the temperature of the transformer has attained or exceeded the predetermined values, and the indicating hands, or pointers, cooperate with the calibrated dial plate to indicate both the instantaneous temperature and the maximum temperature attained in the transformer.

In many instances, a knowledge of the recurrence of certain temperatures in electrical apparatus is desirable. My device registers the recurrence of these temperatures, and the disposition of the registering circular members adjacent the window, on the side of the enclosing hood, permits visibility from a distance. The indicating device is particularly adapted for use with outdoor pole mounted transformers, since the figures on the registering members are so disposed as to be visible from the street at the base of the pole that supports the transformer.

In the accompanying drawings, Figure 1 is a plan view of the device embodying my invention; Fig. 2 is a side view, partially in elevation and partially in section, of the device shown in Fig. 1; Fig. 3 is a side elevational view of the device shown in Fig. 1, illustrating the arrangement of the window therein; Fig. 4 is a vertical section of a transformer showing the disposition of the device shown in Fig. 1 upon a pole-mounted transformer, and Fig. 5 is a vertical section of a transformer illustrating the disposition of a modified form of the device shown in Fig. 1.

A temperature-indicating device 1 comprises a spirally-wound bimetallic member 2, an indicating mechanism 3 and a shaft 4 that is controlled by the bimetallic member 2 to actuate the mechanism 3. The indicating mechanism 3 comprises a stationary dial member 5 that is calibrated in centigrade degrees, a pointer 6 secured to the shaft 4 and a maximum pointer 7 adapted to be actuated by the pointer 6. The mechanism 3 further comprises two circular members 8 and 9 that are mounted on shafts 10 and 11, respectively. Two tubular members 12 and 13 are mounted on the circular members 8 and 9, respectively, and have successive numerals disposed around the surfaces thereof. The shafts 10 and 11 also have two ratchet wheels 14 and 15 respectively mounted thereon. Two pawl members 16 and 17 are adjustably secured to the shaft 4 and are adapted to turn the circular members 8 and 9, respectively, by actuating the ratchet wheels 14 and 15 in one direction through two pivoted end portions 16a and 17a that are mounted on the pawl members 16 and 17, respectively. Two springs 18 and 19 are disposed adjacent the tubular members 12 and 13 to prevent a reversal in the rotation of said members. The indicating mechanism 3 is enclosed by a hood 20 that has a transparent window 21 on its top face through which the indicating dial 5 may be observed, and that has a window 22 in its side through which the figures on the circular members 12 and 13 may be observed. The bimetallic member 2 and the shaft 4 are enclosed in a casing 23 that is adapted to extend through the cover 24 of a transformer casing into the oil surrounding a transformer 25. The casing 23 may be open to permit the transformer oil to enter or may be sealed and contain sufficient oil to surround the bimetallic member 2. The member 2 is secured to a movable block 26 that may be adjustably secured to the side of the casing 23 by a bolt 27.

As the oil in the casing of the transformer 25 becomes heated, the bimetallic member 2 is correspondingly heated and, in expanding, turns the shaft 4 in accordance with the temperature of the oil. The pointer 6 that is secured to the shaft 5 thus indicates directly, on the dial 5, the instantaneous temperature of the oil. The maximum pointer 7 is actuated by the pointer 6 and remains in the extreme position of its movement to indicate the maximum temperature attained by the oil. The maximum pointer 7 is arranged to remain in whatever position it may be placed and may be reset by hand upon the removal of the hood 20. When the oil temperature attains or exceeds a predetermined value, the pawl member 16 so actuates the ratchet wheel 14 as to turn the circular member 8 forward to indicate the next successive figure at the window 22. Similarly, when the oil temperature attains or exceeds some other predetermined value, the circular member 9 is likewise turned, and the figures on the periphery of the two members 8 and 9, therefore, indicate the number of times these two predetermined temperatures have been attained. The springs 18 and 19 serve to prevent reverse rotation of the members 8 and 9 by engagement with the serrated edges of the members 12 and 13. The pawl members 16 and 17 may be adjusted to actuate the circular members 8 and 9 at any predetermined values of temperature.

A modified form of the device embodying my invention is shown in Figure 5 in which a temperature-indicating device 1 is provided that has a closed casing 23, wherein a winding 28 is disposed. The casing 23 contains a quantity of oil, that surrounds the bimetallic member 2 and the winding 28, that is energized from the circuit 29 of the transformer 25 the temperature of which the device 1 is to indicate.

Since the winding 28 is heat-lagged by the oil in a manner similar to the lagging of the windings of the transformer 25, the temperature of the winding 28 substantially follows the temperature of the windings of the transformer 25.

In Fig. 4 is illustrated the angular disposition of a temperature indicator in a transformer 24 mounted upon a pole 30, to permit observation of the indicator from the street at the base of the pole.

Although I have shown a plurality of preferred forms of the device embodying my invention, I do not limit the device to the structures shown, as various modifications may be made therein without departing from the spirit and scope of the invention as set forth in the appended claims.

I claim as my invention:

1. In a temperature indicator for a translating device, the combination with means heated in accordance with the temperature of the translating device, of means controlled by said heated means for indicating the instantaneous temperature thereof, means controlled by said first-named indicating means for indicating the maximum temperature attained by the translating device, and means controlled by said heated means for indicating the number of times a plurality of predetermined different temperatures have been attained in the translating device.

2. A temperature-indicating device for a translating device comprising a thermal device responsive to the hottest temperature in the translating device, means actuated by said thermal device for indicating the instantaneous temperature, means controlled by said first-named indicating means for indicating the maximum temperature attained by the translating device, and means controlled by said thermal device for indicating the number of times a plurality of predetermined different temperatures have been attained in the translating device.

3. In a temperature-indicating device for a translating device, the combination with a thermal-responsive means, of a casing therefor adapted to be disposed in the medium surrounding the translating device, a shaft disposed in the casing and actuated by the thermal-responsive means, a plurality of indicating means disposed outside of said medium and actuated by the shaft at predetermined different high temperatures, and a plurality of indicating means controlled by said shaft for indicating the instantaneous and the maximum temperature attained by the translating device.

4. The combination with a fluid containing tank and a translating device immersed therein, of a thermal-responsive element immersed in the fluid, electro-thermal means associated therewith for influencing said element in accordance with the temperature of the translating device, and separate means each actuated by the thermal-responsive element and disposed outside of the fluid for indicating the instantaneous temperature and the maximum temperature in the translating device, and means controlled by said thermal-responsive element for indicating the number of times a plurality of predetermined different high temperatures have been attained in the translating device.

5. A temperature indicator for a fluid-immersed energy-translating device provided with an enclosing casing, said indicator comprising an elongated casing extending into said fluid through said enclosing casing, a hood secured to said elongated casing and located outside of said enclosing casing, a thermal element in said elongated casing, a shaft extending through said casing and into said hood and actuated by said thermal element, a pointer on said shaft located in said hood for indicating the instantaneous temperature, a second pointer in said hood actuated by said first pointer, a plurality of arms adjustably mounted on said shaft in said hood and a plurality of means in said hood, actuated by the respective arms, for indicating the number of times of occurrence of a plurality of predetermined different high temperatures of said fluid.

6. A transformer having, in combination, a casing, transformer coils within the casing, a body of oil in which the coils are immersed, and a heat controlled indicator supported by the casing and having its heat-sensitive element located so that its indications are substantially unaffected by ambient temperature changes viz; located in the oil body directly over the coils and in close proximity thereto.

In testimony whereof, I have hereunto subscribed my name this 20th day of March, 1920.

HARVEY P. SLEEPER.